(No Model.)
19 Sheets—Sheet 4.
S. LOWE & J. W. LAMB.
KNITTING MACHINE.
No. 349,352. Patented Sept. 21, 1886.
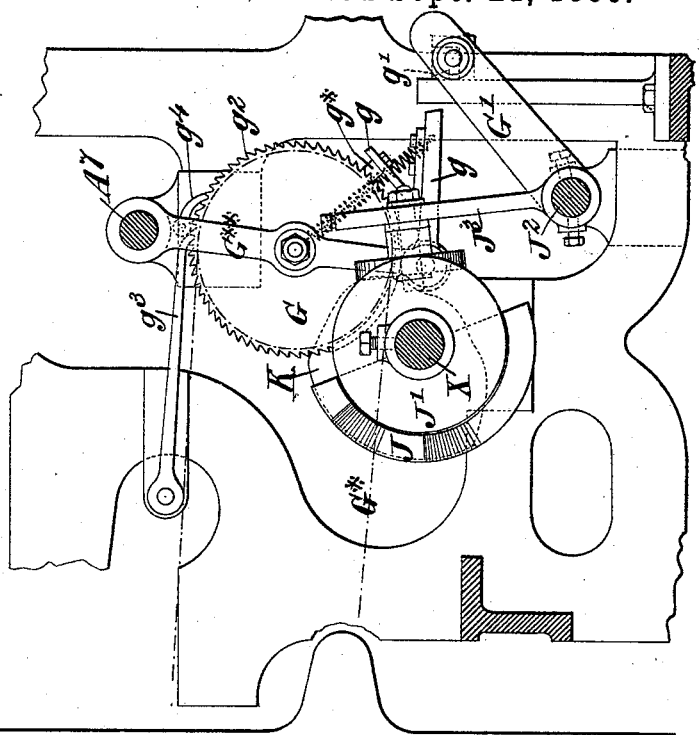
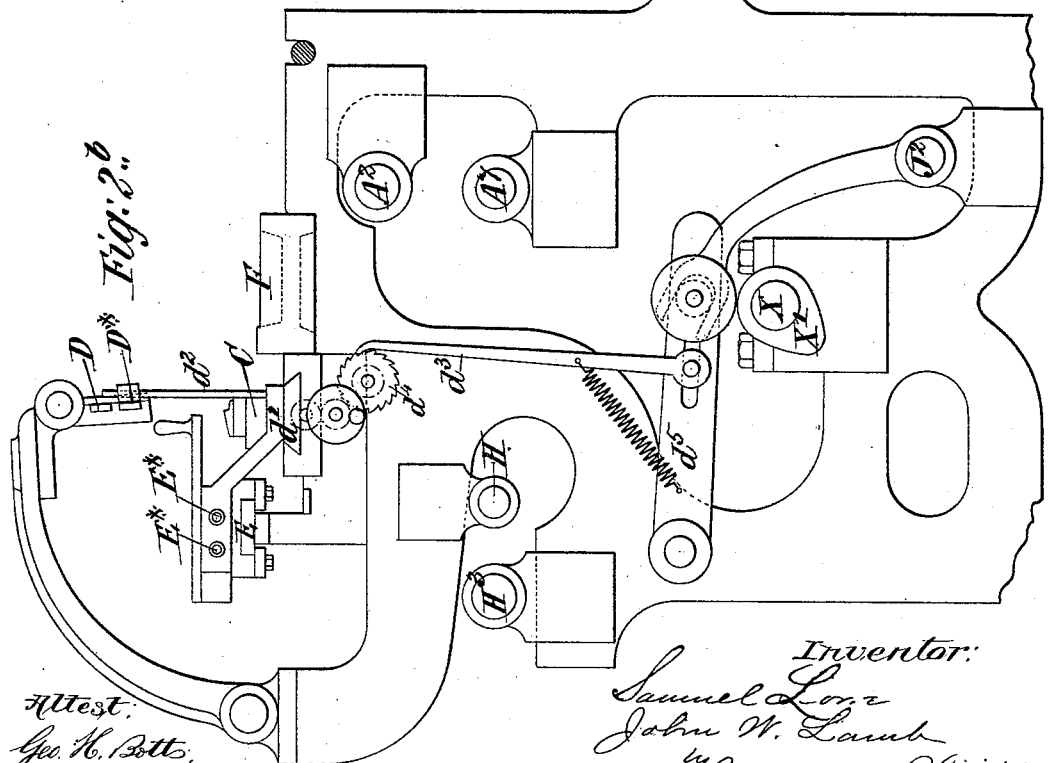

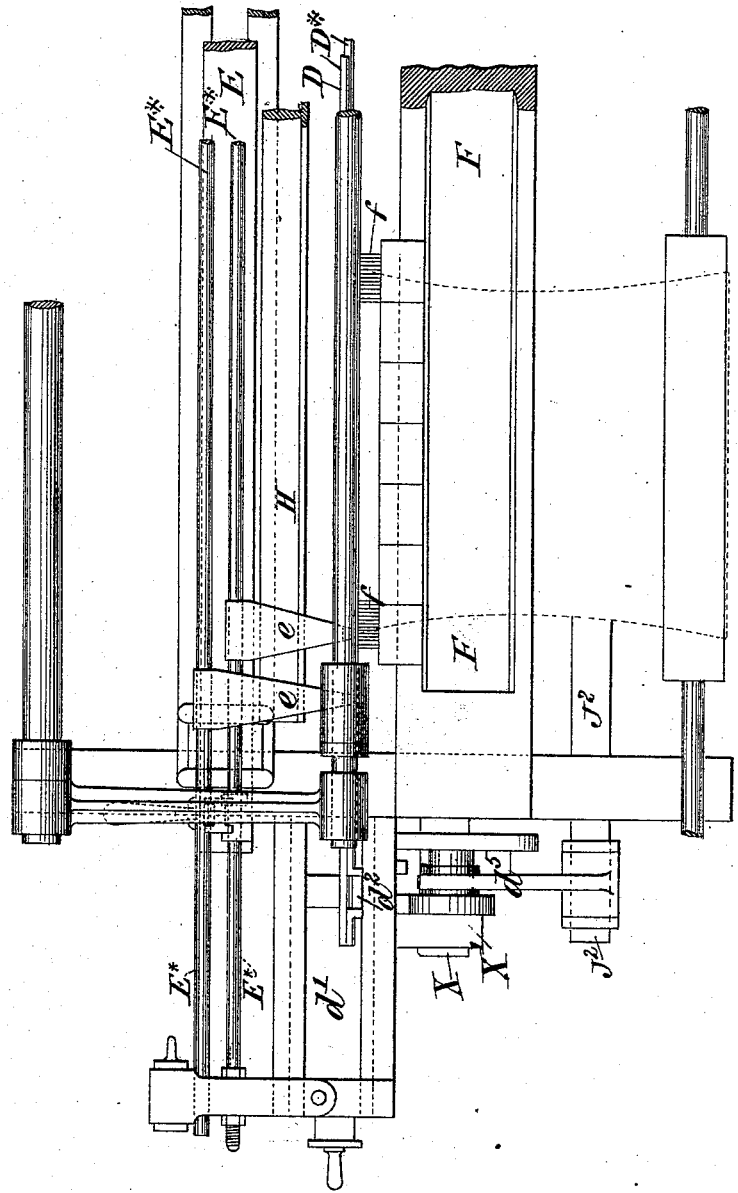

(No Model.)　　　S. LOWE & J. W. LAMB.　　19 Sheets—Sheet 5.
KNITTING MACHINE.
No. 349,352.　　　　　Patented Sept. 21, 1886.
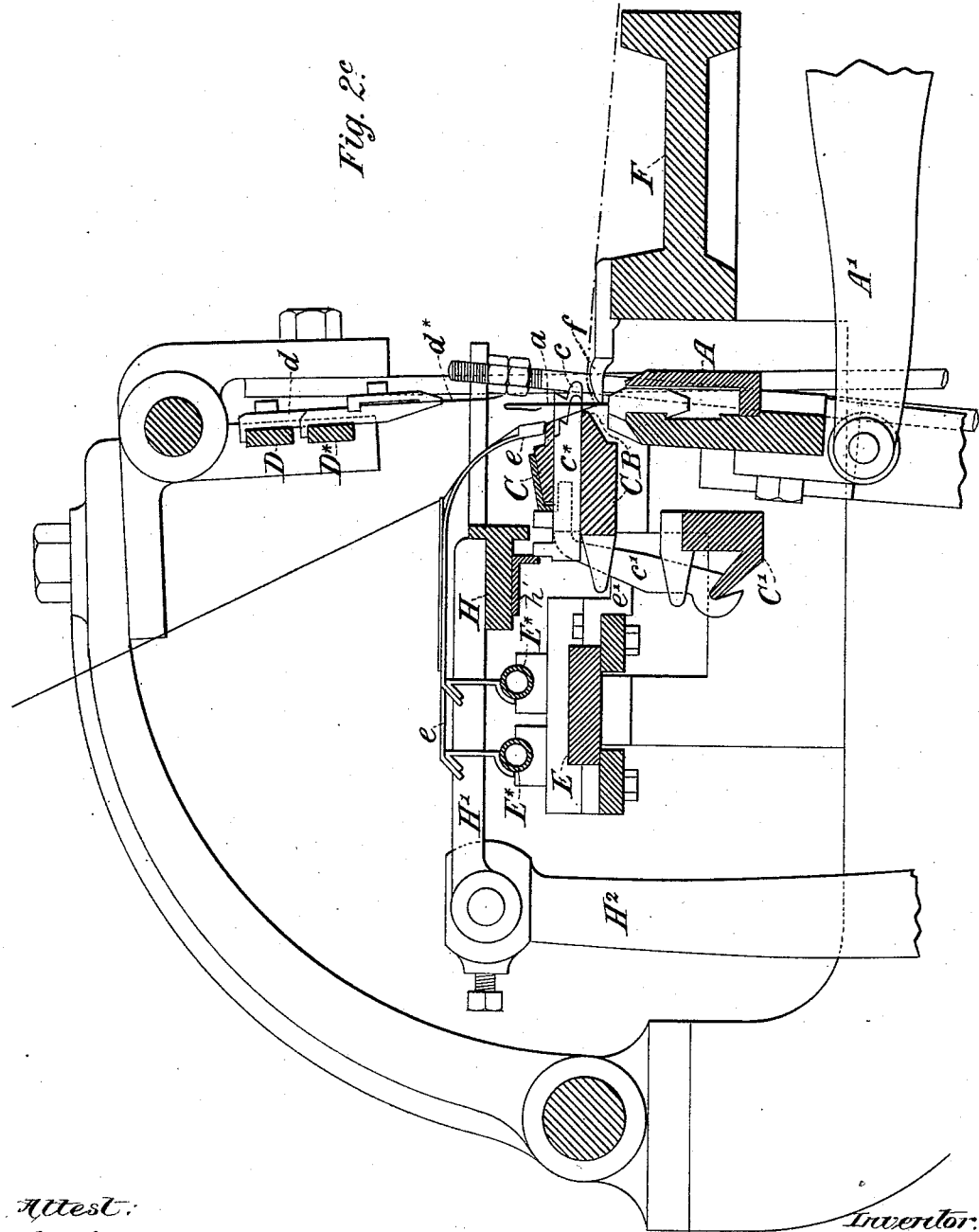
Attest:
Geo. H. Botts
Geo. H. Graham.
Inventor:
Samuel Lowe
John W. Lamb
by Munson & Philipp
attys

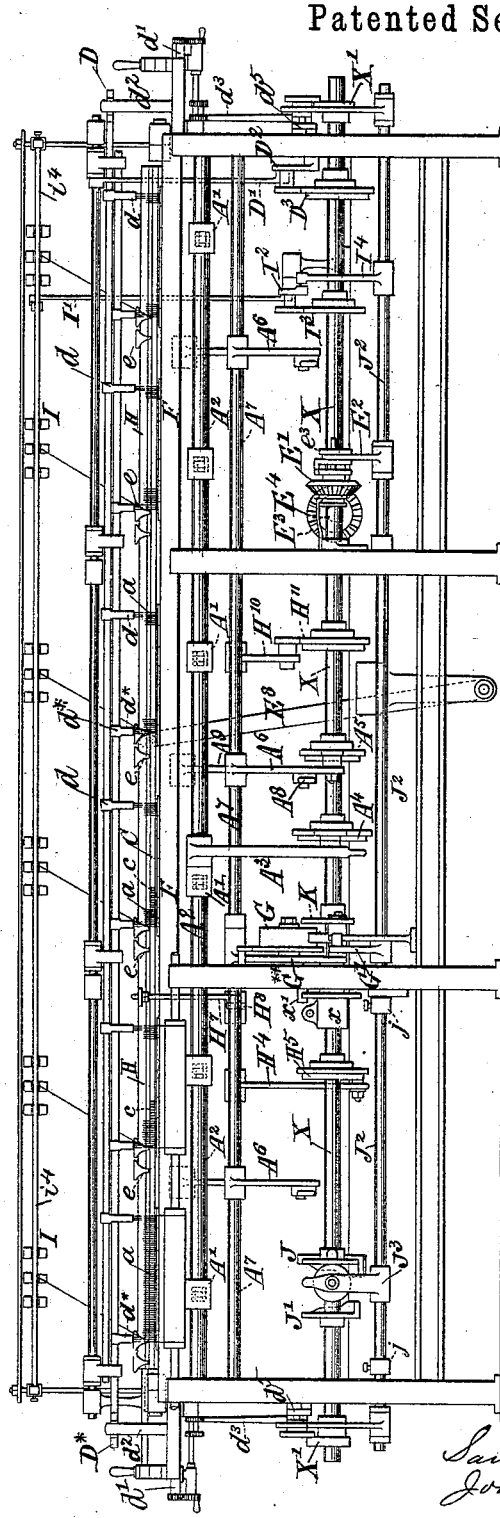

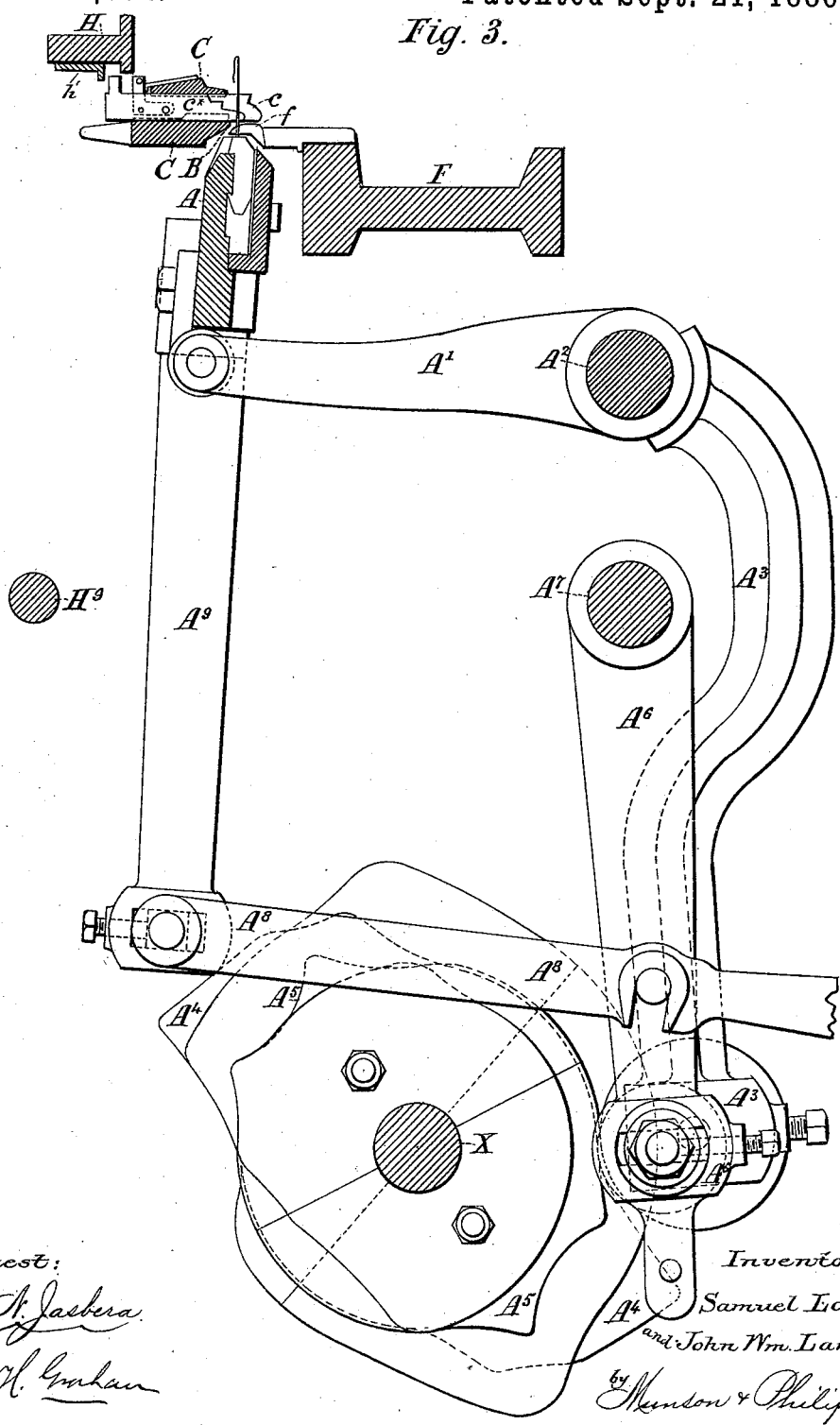

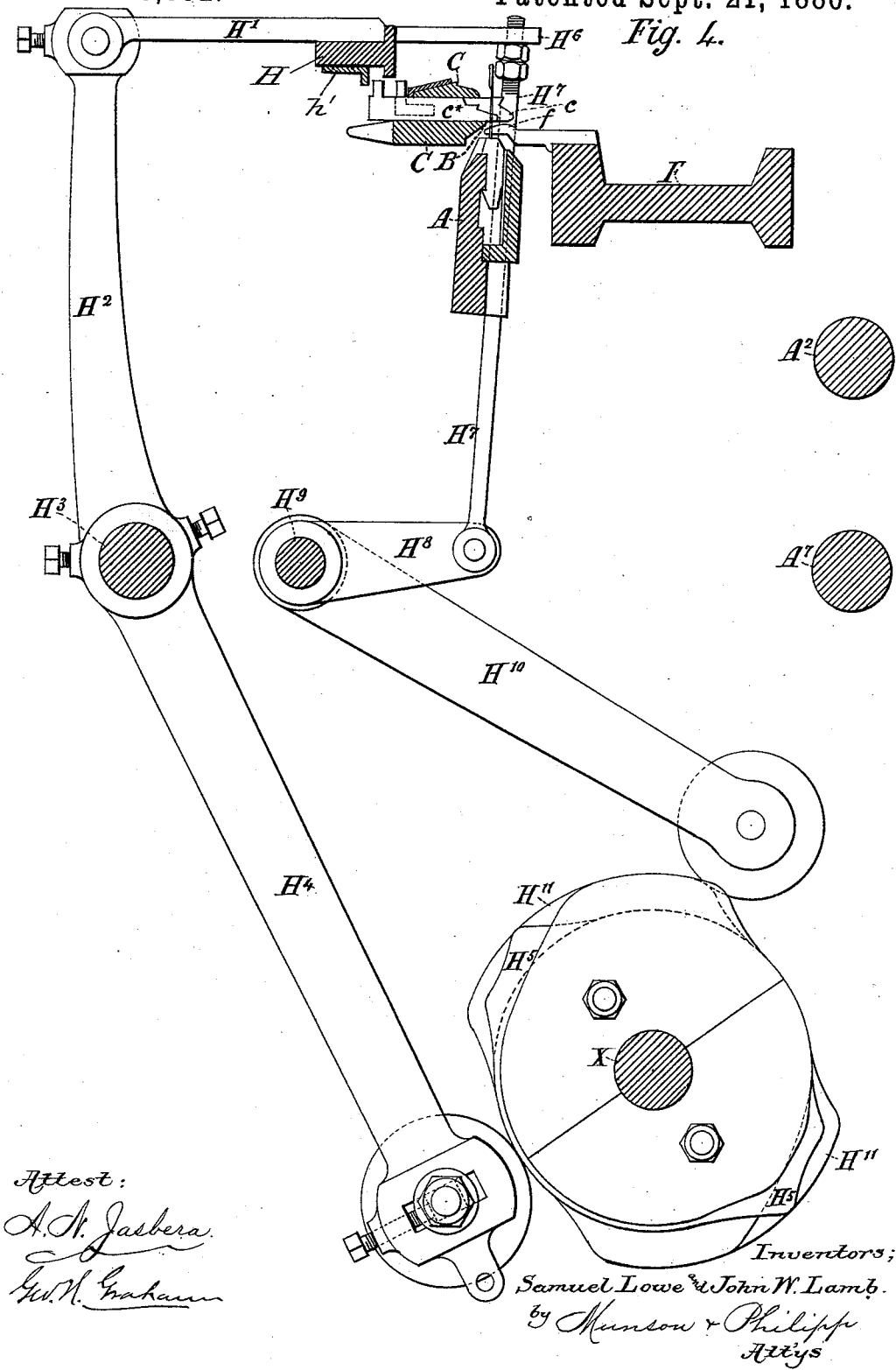

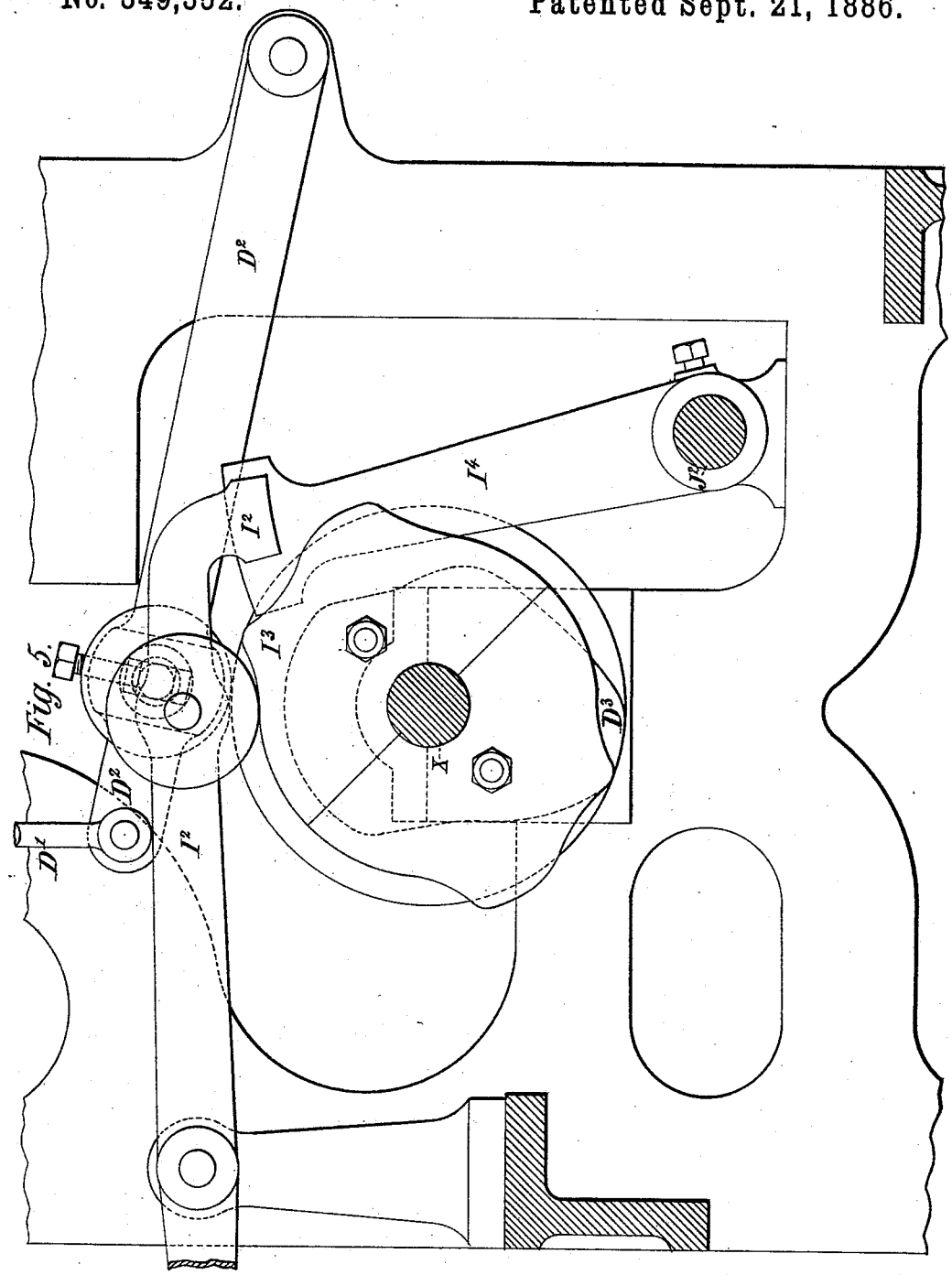

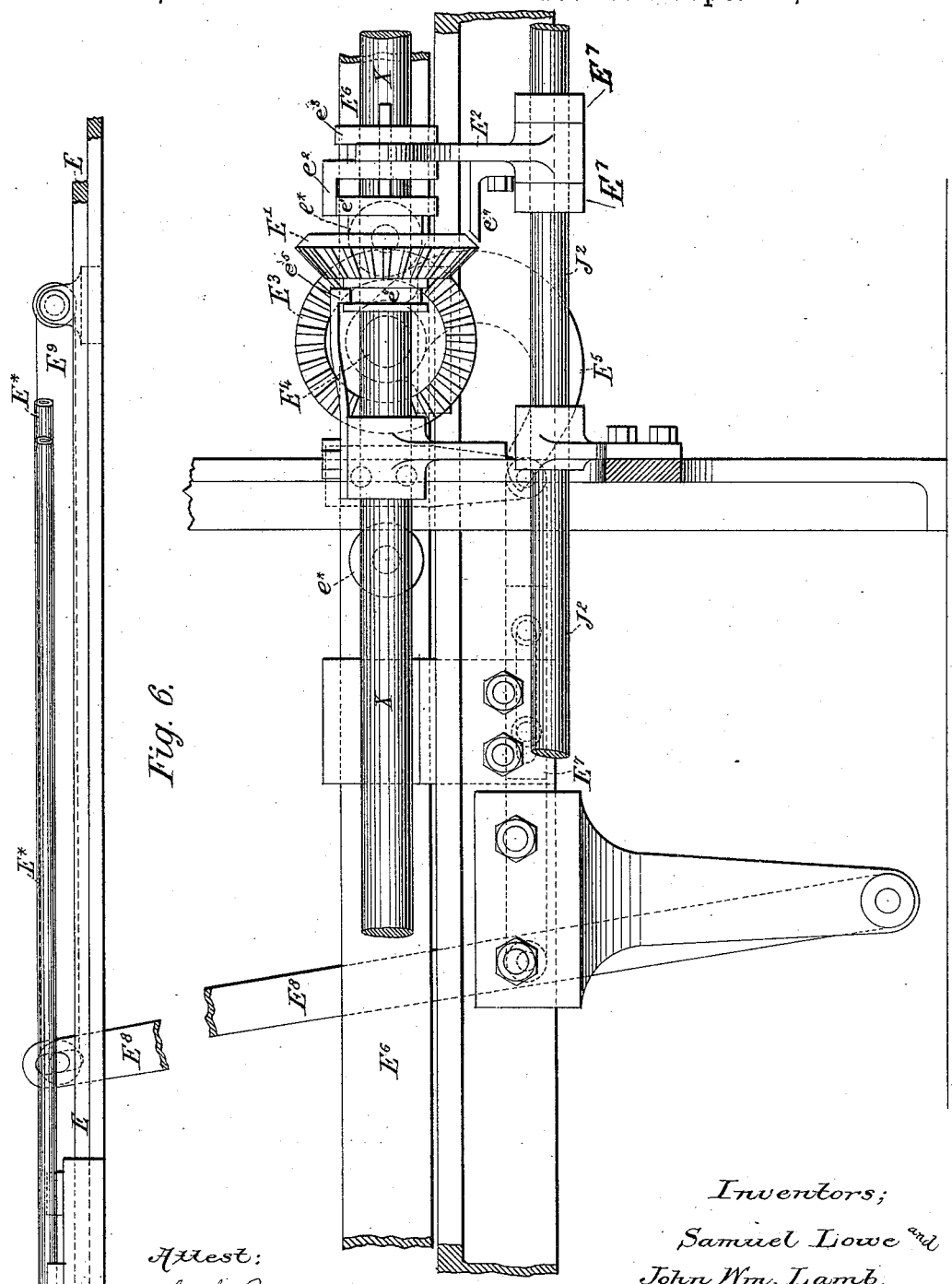

(No Model.) 19 Sheets—Sheet 11.
S. LOWE & J. W. LAMB.
KNITTING MACHINE.
No. 349,352. Patented Sept. 21, 1886.
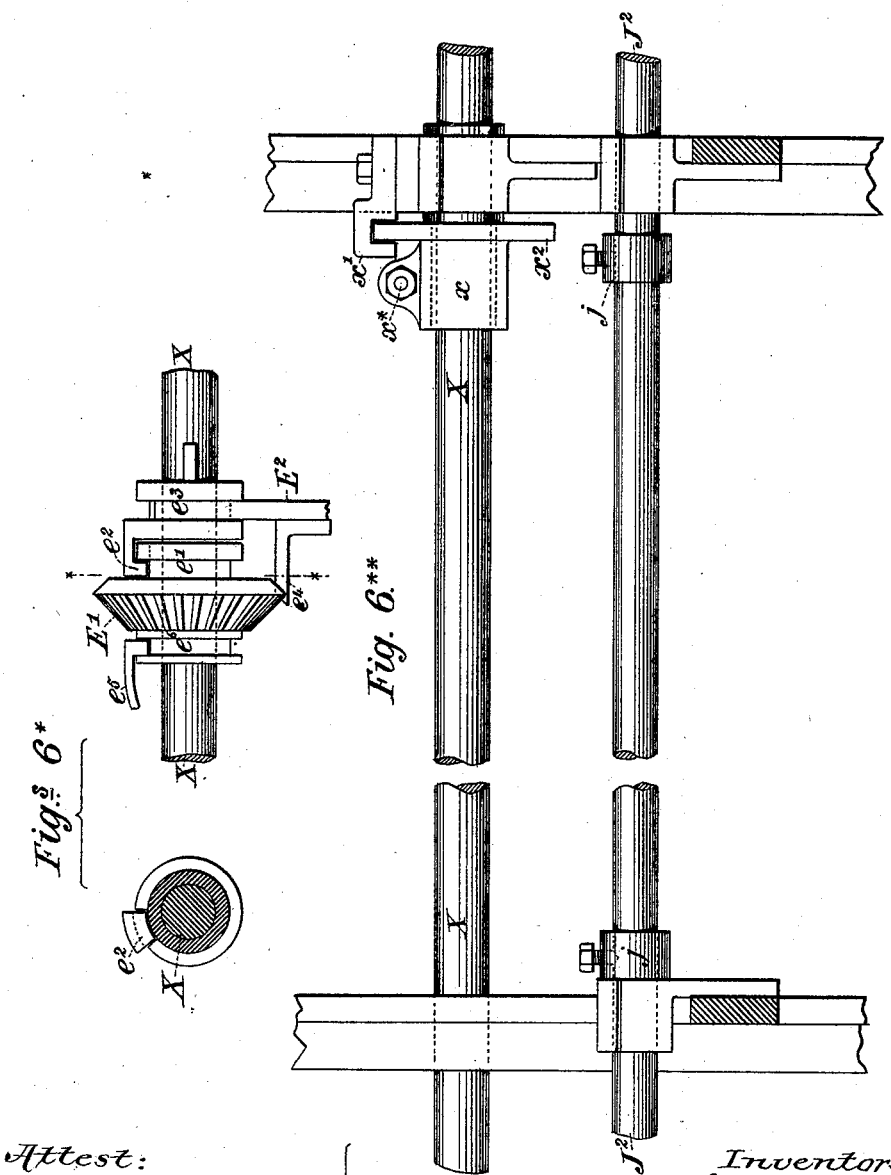

(No Model.)
19 Sheets—Sheet 12.

S. LOWE & J. W. LAMB.
KNITTING MACHINE.

No. 349,352. Patented Sept. 21, 1886.

Attest:
A. N. Jasbera
G. W. Graham

Inventors;
Samuel Lowe and
John Wm. Lamb,
by Munson & Philipp
Attys.

(No Model.)

S. LOWE & J. W. LAMB.
KNITTING MACHINE.

No. 349,352.　　　　　　　Patented Sept. 21, 1886.

19 Sheets—Sheet 13.

Attest:
A. N. Jasbera
G. W. Graham

Inventors;
Samuel Lowe and
John Wm. Lamb,
by Munson & Philipp
Attys.

(No Model.) S. LOWE & J. W. LAMB. 19 Sheets—Sheet 14.
KNITTING MACHINE.
No. 349,352. Patented Sept. 21, 1886.
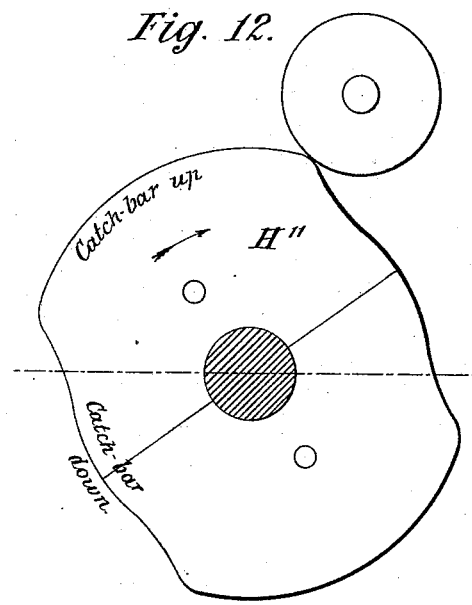
Fig. 12.
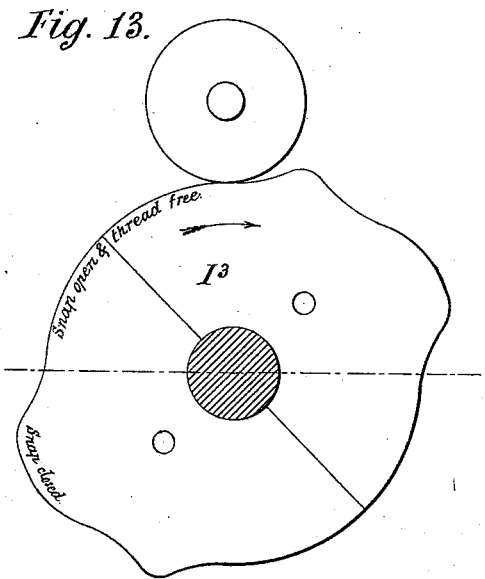
Fig. 13.
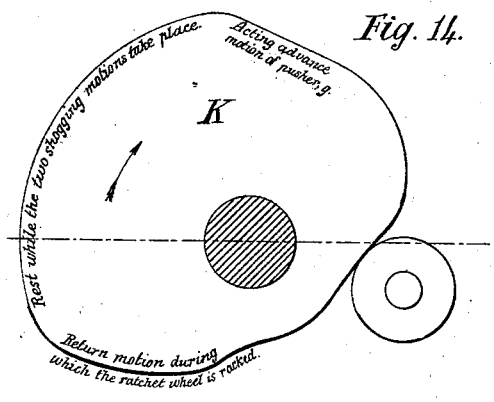
Fig. 14.
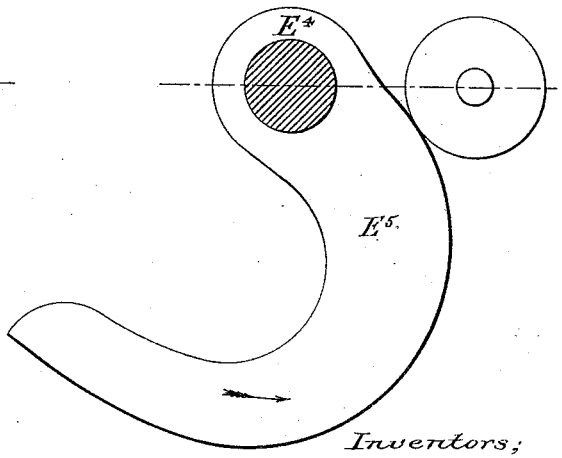
Fig. 6ª.
Attest:
A. N. Jasbera
Geo. H. Graham
Inventors;
Samuel Lowe and John Wm. Lamb,
by Munson & Philipp
Atty's.

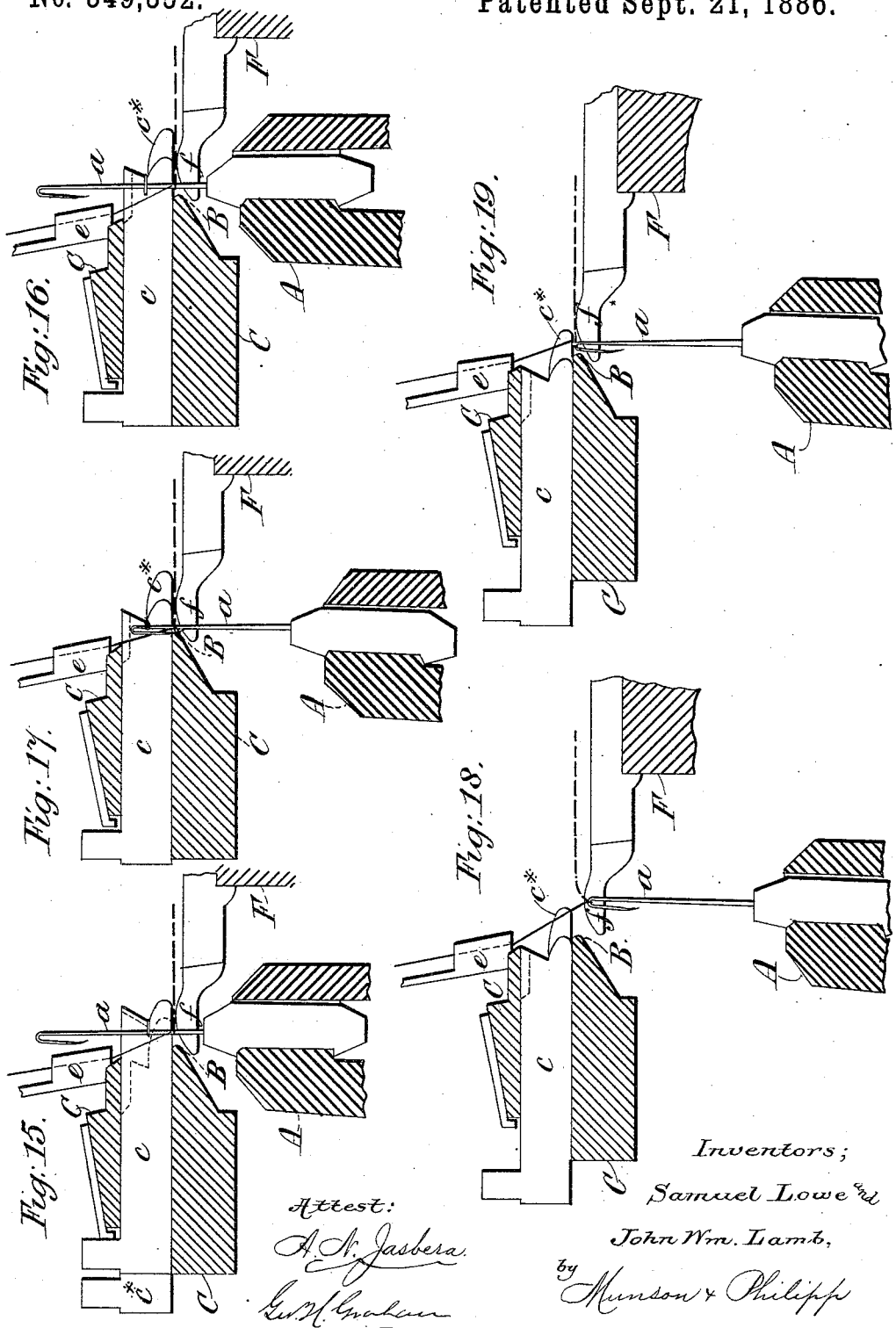

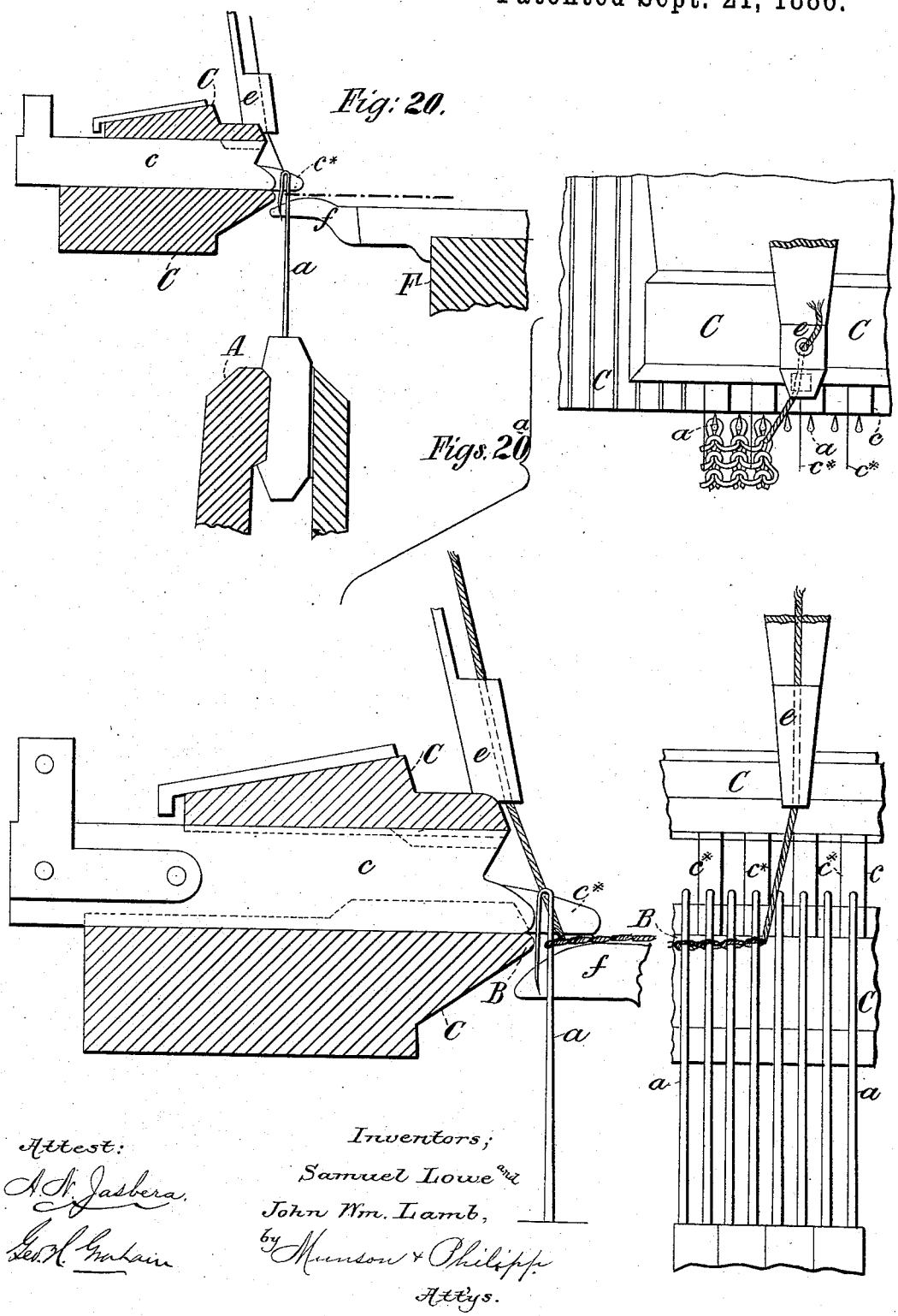

(No Model.)
S. LOWE & J. W. LAMB.
KNITTING MACHINE.
No. 349,352.   Patented Sept. 21, 1886.
19 Sheets—Sheet 17.
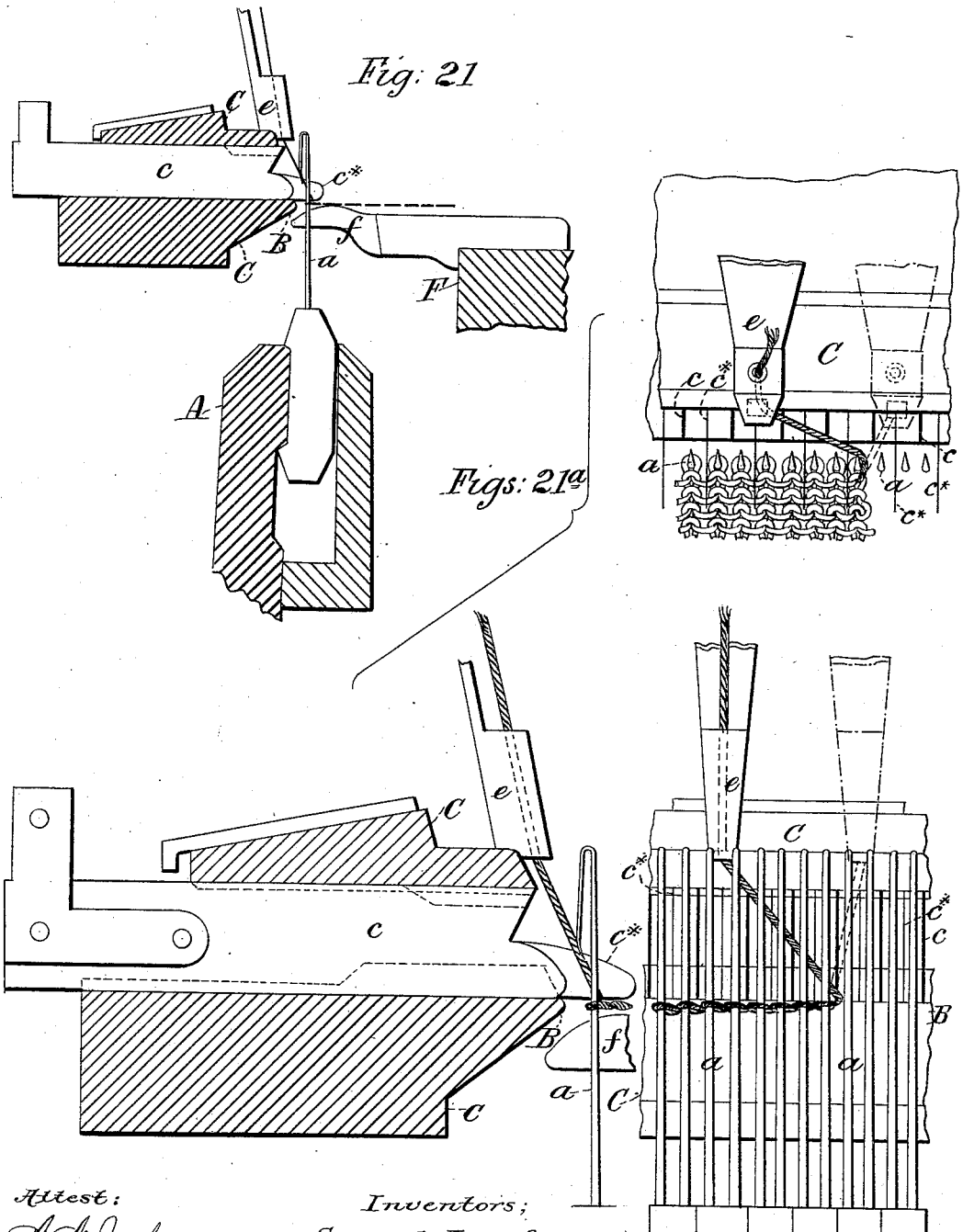

(No Model.)   19 Sheets—Sheet 18.

S. LOWE & J. W. LAMB.
KNITTING MACHINE.

No. 349,352.   Patented Sept. 21, 1886.

Attest:
A. N. Jasbera
Geo. H. Graham

Inventors;
Samuel Lowe and
John Wm. Lamb,
by Munson & Philipp
Attys.

(No Model.)
S. LOWE & J. W. LAMB.
KNITTING MACHINE.
No. 349,352.
19 Sheets—Sheet 19.
Patented Sept. 21, 1886.
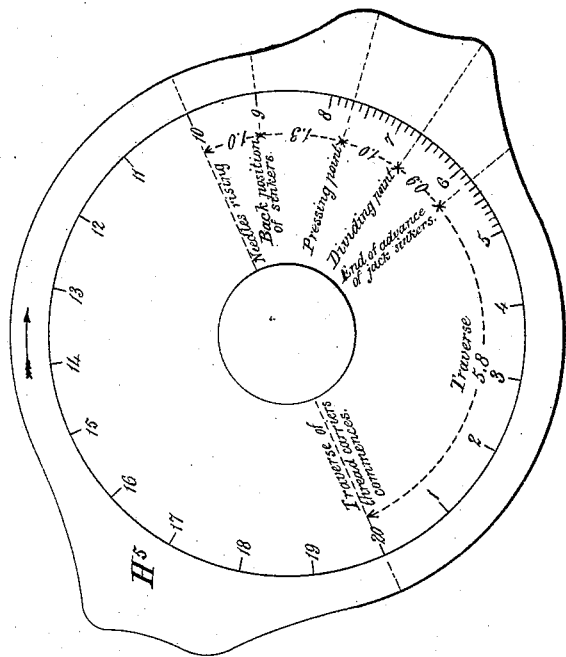
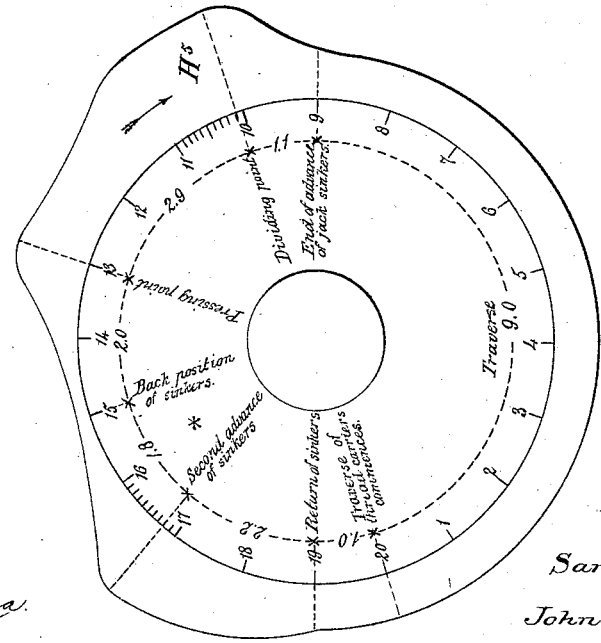
Attest:
H. N. Jasbera.
G. H. Graham.
Inventors;
Samuel Lowe and
John Wm. Lamb,
by Munson & Philipp
Attys.

UNITED STATES PATENT OFFICE.

SAMUEL LOWE AND JOHN WILLIAM LAMB, OF NOTTINGHAM, COUNTY OF NOTTINGHAM, ENGLAND.

KNITTING-MACHINE.

SPECIFICATION forming part of Letters Patent No. 349,352, dated September 21, 1886.

Application filed November 5, 1883. Serial No. 110,878. (No model.) Patented in England May 10, 1883, No. 2,383; in Germany October 9, 1883, No. 27,686, and in France November 9, 1883, No. 158,448.

*To all whom it may concern:*

Be it known that we, SAMUEL LOWE, machinist, and JOHN WILLIAM LAMB, manufacturer, both of Nottingham, in the county of Nottingham, England, have invented certain new and useful Improvements in Knitting-Machines, of which the following is a specification, reference being had to the accompanying drawings, forming a part hereof.

Figure 1:
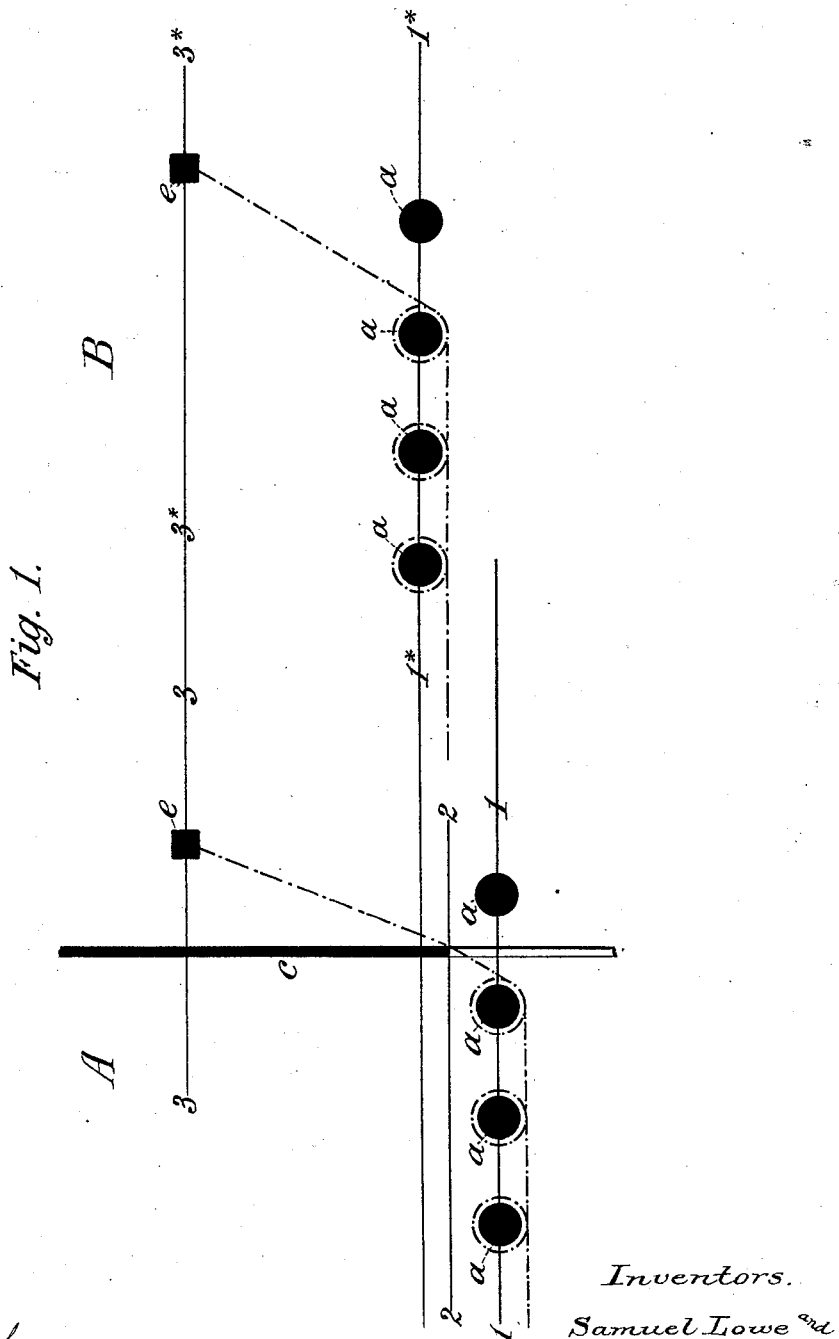
Figure 2:
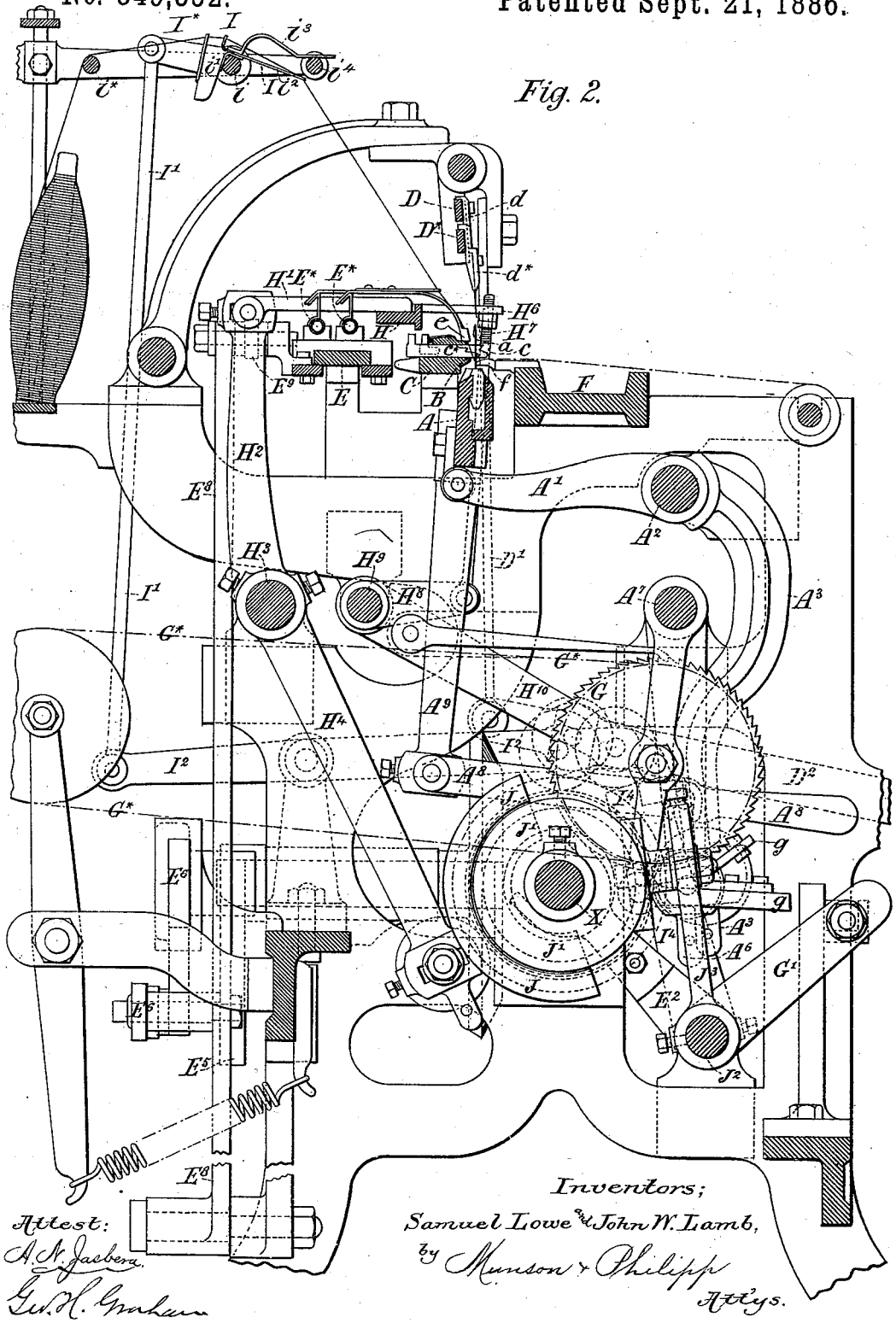
Figure 8:
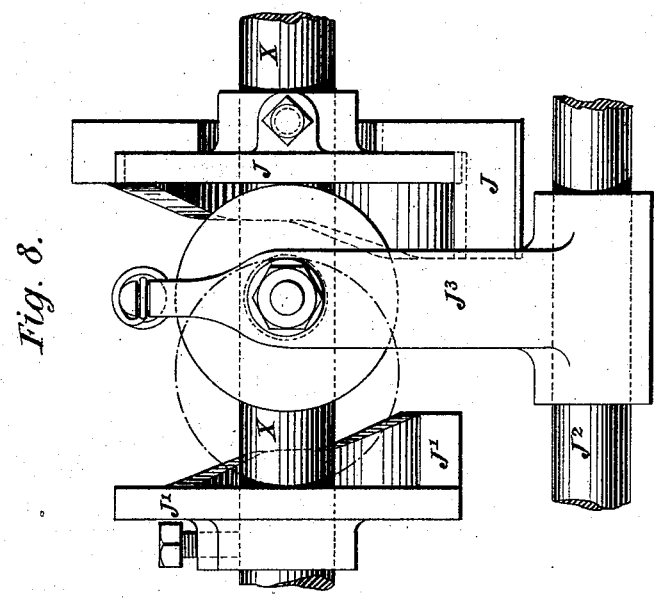
Figure 7:
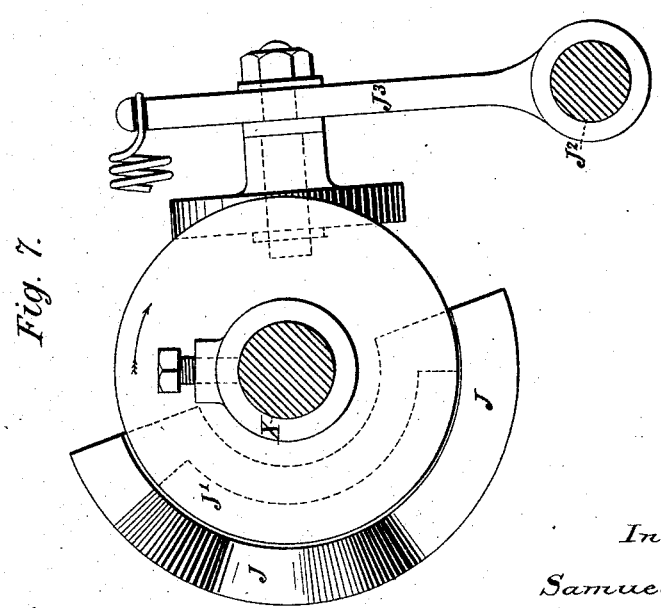
Figure 9:
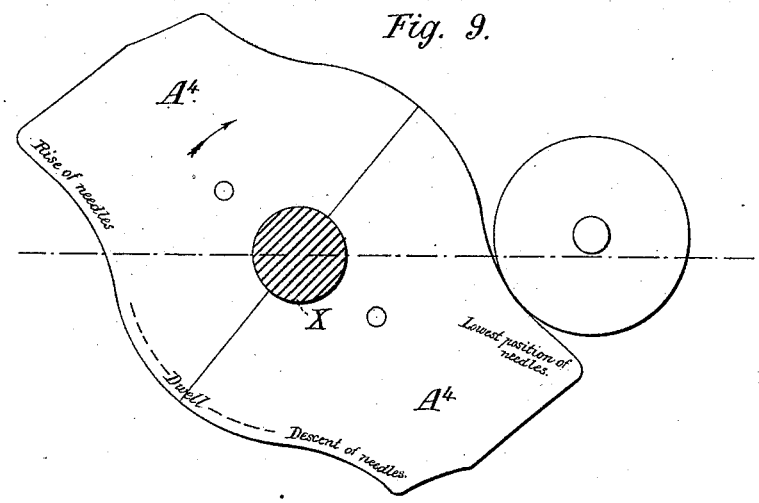
Figure 22A:
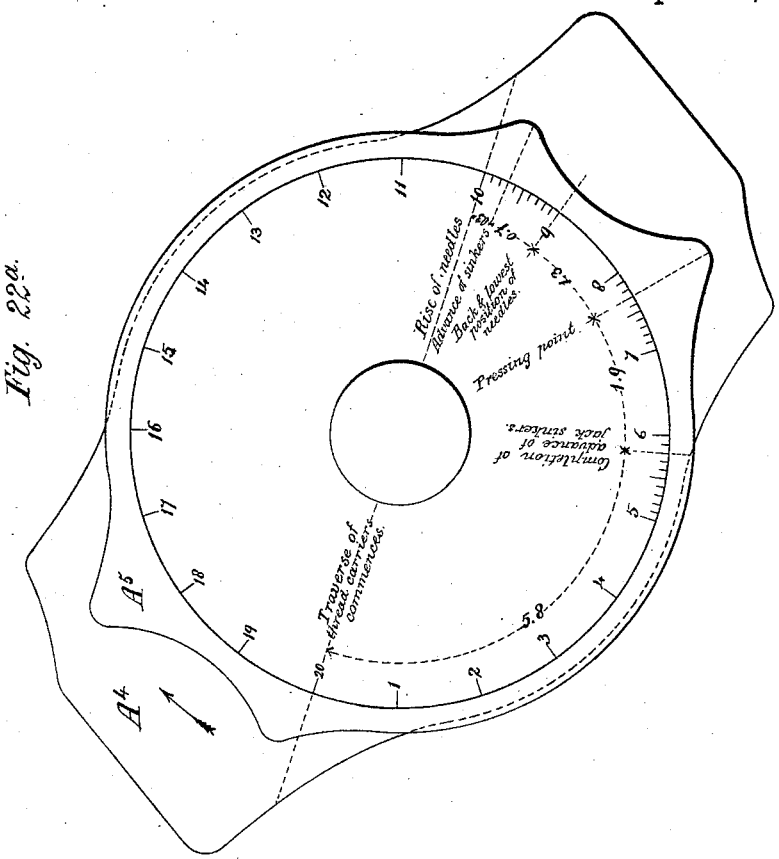
Figure 22:
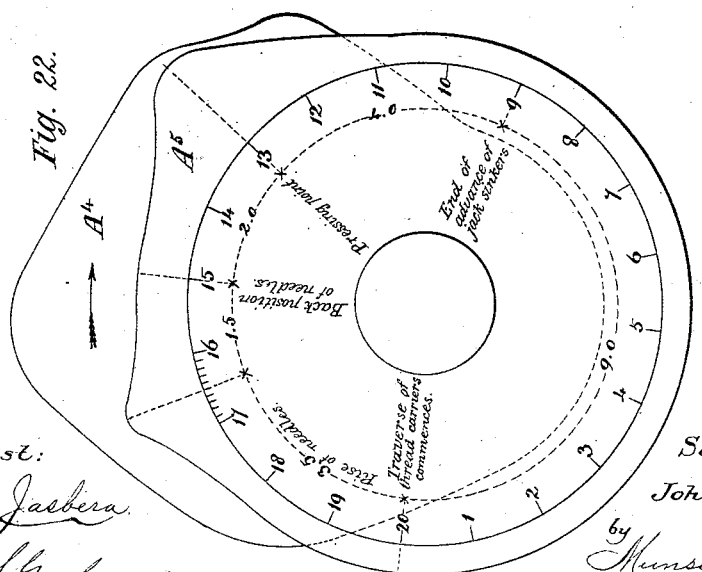

In said drawings, Figure 1 is a diagram, in which A represents the position of the parts commonly adopted in the "Cotton" machine, (hereinafter mentioned,) for insuring a perfect selvage, and B shows the new position of the parts for effecting the same object; Fig. 2, a transverse sectional elevation of a Cotton knitting-machine such as that we propose to improve, the position only of those cams which are to be replaced by other cams being indicated by dotted circles; Fig. $2^a$, a partial plan view of the left-hand end of the machine; Fig. $2^b$, a partial end view of the machine; Fig. $2^c$, an enlarged transverse sectional elevation of the upper portion of the machine; Fig. $2^d$, a front elevation of the complete machine embodying our improvements; Fig. $2^e$, a partial transverse sectional elevation showing particularly the shogging-cam, tappet-chain, and the immediate connecting mechanism; Fig. 3, a partial sectional elevation showing particularly the needle-bar mechanism; Fig. 4, a similar view showing particularly the levers and cams for operating the catch-bar; Fig. 5, a similar view of the modified mechanism for giving motion to the snapping apparatus; Fig. 6, a partial longitudinal sectional elevation showing particularly the modified mechanism for giving two traversing motions to the thread-carriers for one rotation of the cam-shaft. Figs. 6* and 6** show, respectively, detached views of the miter-wheel, its clutch, and the cam-shaft, and the cam and shogging shafts and friction-clip, with a portion of the supporting frame-work; Fig. $6^a$, a detached view of the cam employed for imparting the motions to the thread-carriers. Figs. 7 and 8 show, respectively, in front and sectional elevation, detached views of the shogging-cam and immediate connecting mechanism. Figs. 9 to 14, inclusive, are detached views of the cams hereinafter particularly referred to. Figs. 15 to $21^a$, inclusive, are enlarged diagrams illustrating the various motions of the knitting instruments. Figs. 22 and $22^a$, 23, and $23^a$ are diagrams of cams to be hereinafter referred to.

The object of this invention is to increase the production of knitted work in straight-knitting machines furnished with the well-known Cotton traversing thread-carriers, as shown and described in the United States Patent granted to William Cotton, and dated November 20th, 1886, No. 59,892.

This object we successfully attained by an arrangement of mechanism which formed the subject of United States Letters Patent granted to us and bearing date January 16, 1883, No. 270,682. In the specification of that patent we described the use of a row of points which served to receive the threads from the thread-carriers and transfer them in a "divided state" to the stems of the needles. This produced great economy in point of time, as it enabled the consecutive operations to be brought more closely together than heretofore, so much so, indeed, as to permit of the duplication of the various operations during one rotation of the cam-shaft without interfering with the "fashioning" of the work. We now propose to effect the like result without the use of this row of points, and thereby to simplify the construction of the machine. For this purpose we so alter the ordinary Cotton knitting-machine as to modify the motions of the jack-sinkers, the dividing-sinkers, and also of the needles. In the old machine the jack and dividing sinkers were given two advance motions for each course, the first motion of which was to effect the sinking or drawing off of the thread to the extent desired for the loops of the particular fabric being produced, and the second being to secure, as is well known, two things—viz., the holding down of the work and the prevention of the thread (while the needles were just emerging from between the sinkers) from slipping to the inner side of the selvage-needles, and thereby forming an imperfect selvage. In the present construction we give to the sinkers but one advance motion for the course, instead of two, as heretofore, the said second movement being dispensed with. The needles, so soon as the divided thread is brought under their beards, are advanced to the presser-bar, and having brought the new loops over the beards, we rock back the needles to assist in clearing the last laid thread from the sinkers, simultaneously drawing back the sinkers to their inactive position. We then draw down the needles between the knocking-over bits to complete the new course. We next rock forward the needles, and bring them up between the "nebs" of the sinkers to receive the thread from the advancing thread-carrier. As the carrier moves forward, the jack-sinkers will advance, and the dividing sinkers will follow them, as shown and described in the above-mentioned patent granted to William Cotton, the thread being laid upon the needles and indented and divided by the sinkers, as usual. The advance of the needles to the sinkers, preparatory to their rising to take the thread, will bring the work which they carry under the nebs of the dividing-sinkers, and enable the dividing-sinkers to hold down the work as the needles rise. A further and most important advantage of this advance of the needles is that it brings them nearer to the plane of motion of the thread-carriers, and thereby insures the selvage-needles rising to the proper side of the thread to form the selvage-loops without the assistance of the sinkers. This will be better understood by reference to the diagram, Fig. 1, wherein at A the lines 1, 2, and 3, represent, respectively, the vertical planes, in which the needles $a$, the throat of the jack-sinkers $c$, and the carrier $e$ stand with regard to each other in the ordinary Cotton machine at the time that the selvage-needle is rising to put the thread, just previous to the starting of the thread-carrier, on its proper side. At this time the jack-sinkers $c$ are in an advanced position, the object being to hold the thread which extends from the selvage-loop to the thread-carrier at such an angle as to keep it at the back of the needle or clear of the head of the needle as it rises. Thus the selvage-needle in rising will have the thread on its outer side or in the proper position for the thread-carrier in its advance to lay it around that needle.

Referring now to B it will be seen that the plane of the needles has advanced from $l$ to $l^*$, or so near to the plane of motion of the thread-carrier as to enable the thread to lie, without the assistance of the jack-sinker, at the proper angle for insuring the lap of the thread around the selvage-needle. It is mainly by insuring this result without the aid of the jack-sinkers that we are enabled to expedite the knitting operation to an extent that will at the least double the capacity of the Cotton machine.

It should be remarked that the extra speed of knitting does not apply to the operation of fashioning as the time required for the shifting of the loops by the aid of the fashioning-points does not admit of being materially altered.

We will now explain in detail the manner in which we modify the construction of the machine so as to secure the results above specified, prefacing our explanation with a reference to the various working parts of the well-known machine.

A, Fig. 2, represents the needle-bar carrying the bearded needles $a$, as usual; B, the fixed presser; C, the sinker-bar carrying the jack and dividing sinkers $c$ $c^*$.

C', Fig. $2^a$, is the bar carrying the jacks $c'$, by which the sinkers $c$ are advanced as heretofore.

D D* are the ordinary fashioning-point bars, and $d$ $d^*$ the fashioning-points which they carry.

E is the slur-bar carrying the traversing slur-box, and on which is mounted the sliding rods E* E*, which carry the thread-layers $e$. (See, also, Fig. $2^a$.)

$e'$ is the incline or slur cock, also mounted on the slur-box, for advancing the jacks successively and forcing forward the jack sinkers to indent the thread.

F is the stationary knocking-over bar, on which are mounted the knocking-over bits $f$, as usual.

G*, (see Figs. 2 and $2^a$,) is the chain of the ordinary counting apparatus carried by the chain-wheel G.

H is the catch-bar (common to the Cotton machine) for advancing the dividing sinkers $c^*$ and for withdrawing the sets of sinkers $c$ and $c^*$. The jack-sinkers $c$ are driven forward successively by the jacks $c'$, striking their rear ends, (see Fig. $2^a$,) the jacks being caused thus to act upon their respective sinkers by the pressure on the jacks of the traversing double incline or slur-cock $e'$, carried upon the traversing-carriage with which the thread-carrier rods E* E* are frictionally connected. When all the jack-sinkers $c$ have been advanced and the required amount of slack thread for the formation of a row of loops has been indented by them between alternate pairs of needles, the dividing-sinkers $c^*$ will be next advanced by the catch-bar H, (in its advancing movement, by its projecting lip $h'$ bearing against the rear ends of said sinkers $c^*$,) to lap the thread around the remaining needles. In doing this the catch-bar H will insure all the sinkers coming into line in advance of the needles. The thread laid upon the needles will thus have been indented by the jack-sinkers $c$ and divided by the dividing-sinkers $c^*$, and these divided loops will then be brought under the beards of the needles, by reason of the descent of the needles, the pressing operation and the knocking-over operation being repeated, as before described.

I is the snapping apparatus, (see Fig. 2,) consisting of a rock-shaft, $i$, carried in bearings on a bracket supported by the frame. This rock-shaft carries oil-cups $i'$, thread-guide arms $i^2$, and presser-springs $i^3$—a set for each thread used in the machine. This snapping apparatus is employed for putting a tension on the thread or stopping the supply to the machine, as required.

J J' are the shogging-cams for shogging the shaft J² and the cam-shaft X through the arm J³, carried by the former shaft, the bowl carried by this arm being presented to the action of the cam J or J', as the case may be, by the counting apparatus in the manner common to the Cotton machine.

d' is the fashioning-slide on the left-hand end of the machine. (See Figs. 2ª and 2ᵇ.) The fashioning-slide on the right-hand end of the machine is of similar construction. These fashioning-slides carry standards d², which are embraced by projecting lugs carried by the fashioning-bars D D*, and they are moved endwise with the slides d' d' when the selvage-loops are to be shifted onto adjoining needles during the operation of fashioning. The slides d' d' are moved inward, as usual, by traversing screws operated by the pawl d³, acting upon the ratchet-wheel d⁴, with which the traversing screws are connected by gearing. The pawls d³ are pivoted on rock-levers d⁵, carrying bowls, which are acted upon after the shogging of the cam-shaft—that is, during the operation of fashioning—by cams X', keyed on the cam-shaft.

Figure 10:
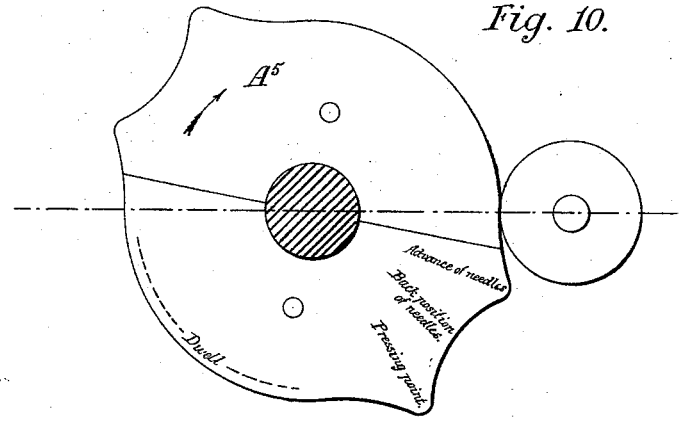
Figure 11:
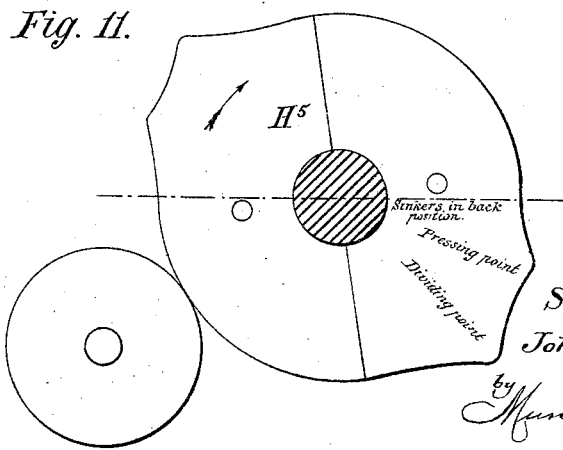

To enable the mechanism just described, which is of the old and well-known type, to work in the manner as indicated in the introductory part of this specification, and thereby to double the power of production of the machine, we modify the machine in the manner now to be particularly described, reference being had to Figs. 2ᵈ, 3, to 8, inclusive. The needle-bar (see Fig. 3) is pivoted, as usual, to rocking arms A', keyed on a rock-shaft, A², which has its bearings on the main framing. Keyed to this rock-shaft are arms A³, furnished with anti-friction bowls, which by means of tension-springs (not shown in the drawings) bear on the cams A⁴, keyed to the cam-shaft X, and cut so as to make them duplex or double-acting. This cut of cam is shown best in the detached view, Fig. 9. These cams serve by their rotation to impart to the needles the requisite rising and falling motions, and they are supplemented, as heretofore by single-acting cams which come into operation (on the shogging of the cam shaft) during the fashioning. The needles are advanced to and withdrawn from the presser B by duplex or double-acting cams A⁵ on the cam-shaft, the cut of which cams is best shown at Fig. 10. These cams act on bowls carried by the pendent arms A⁶, keyed to a rock-shaft, A⁷, having its bearings in the main framing. The arms A⁶ are connected by links A⁸ to projections A⁹, pendent from the needle-bar, to bring the beards of the needles into contact with the stationary presser-bar B. These cams A⁵ are (like the cams A⁴) supplemented by single-action cams which operate only during the fashioning. The catch-bar H (see Fig. 4) is constructed in the well-known manner common to the Cotton knitting-machine. The dividing-sinkers c* are advanced to and withdrawn from their work, together with the jack-sinkers c, by means of the catch-bar H, which is connected by bracket-arms H' to the upper extremities of rock-levers H², keyed to a rock-shaft, H³, having its bearings in the main framing. Keyed to and pendent from this rock-shaft are arms H⁴, which carry bowls that bear upon double-acting cams H⁵ on the cam-shaft, and it is by the rotation of these cams that the catch-bar is caused to advance and recede in the manner requisite for producing the modified action of the sinkers above described. The cut of these cams is shown at Fig. 11. In advancing, this catch-bar bears against the rear ends of the dividing-sinkers, and in retiring it draws back both the sinkers c* and c, it having but one advancing and one return motion during the formation of one course of knitting, instead of two, as in the ordinary machine. A vertical reciprocating motion is given to the catch-bar, as usual, to enable it to place a lip or flange with which it is provided in front of the projections of all the sinkers. Standing out from the front of the catch-bar are rigid arms H⁶, to which are attached rods H⁷, that couple these arms with the arms H⁸, keyed to a rock-shaft, H⁹, having its bearings on the main framing. This rock-shaft is fitted with pendent arms H¹⁰, keyed thereto, and carrying bowls that receive the pressure of a pair of double-acting cams, H¹¹, on the cam-shaft, the cut of which is shown at Fig. 12. By the rotation of these cams the catch-bar will be raised and lowered at the proper moment for engaging with or releasing the sinkers. The double-acting cams H⁵ and H¹¹ are supplemented by single-action cams which come into operation on the shogging of the cam-shaft to give time for the formation of the fashioned courses.

The mechanism for giving motion to the "snapping" apparatus I, Fig. 2, by which the supply of thread to the thread-carriers is controlled, and also the rising and falling motion to the fashioning apparatus, is shown particularly at Fig. 5, the mechanism for which latter operation remains unchanged in construction. I' is a rod jointed to and pendent from an arm, I*, of the rock-shaft i of the snapping apparatus. The lower end of this pendent rod is pivoted to the end of the rock-lever I², the fulcrum of which is carried on the framing of the machine. This rock-lever carries a bowl that bears on the double-acting cam I³ on the cam-shaft, the cut of which is more clearly shown at Fig. 13. This cam gives the requisite duplex action to the snapping apparatus while the knitting is proceeding. The threads which are to be acted upon by the snapping apparatus pass from the spools over the guide-rods i* and the oil-cups i', and through the eyes at the outer end of the arms i², and thence to their respective thread-layers. When the arms i² are raised by the action of the cam I³ upon lever I², rod I', and arm Iˣ so as to lift the end of the springs $i^3$ off the rod $i^4$ on which the springs bear, tension will be put upon the threads. While the indenting of the threads is taking place the threads pass freely through the snapping apparatus, which is then in the position shown at Fig. 2. A little tension is put on while "dividing." The tension is slightly slackened while the loops are being knitted and again increased while the work is moved back. This action is repeated for every succeeding course, as will be fully understood by reference to said Fig. 5 and to the cut of the cam $I^3$, Fig. 13. The front end of the lever $I^2$ extends forward and is formed with a bearing-face. The shogging of the shaft $J^2$ brings a prop, $I^4$, under the lever $I^2$, and holds it in its raised position while the fashioning is proceeding, thus holding the arms $i^2$ in their raised position and causing them to grip the threads between the ends of the arms and the springs $i^3$. The snapping apparatus will then hold the threads firmly from being drawn off the spools, so as to avoid the disturbance of the loops during the operation of fashioning. Thus the further supply of thread to the needles is stopped until the fashioning apparatus is thrown out of action.

D' is a rod pendent from the fulcrum-bar of the fashioning apparatus, and at its lower end it is pivoted to the rock-lever $D^2$, which has its fulcrum on a stud projecting from the main framing. This lever $D^2$ carries a bowl which bears on a rest-cam, as usual, while the machine is knitting; but, by the shogging of the cam-shaft, this rest-cam is replaced by the cam $D^3$ when the fashioning is to take place. By the rotation of this cam $D^3$ the lever $D^2$ is caused to lift the rod D', which, through its connection with the fulcrum of the fashioning apparatus, will raise that apparatus out of action. As the smaller radius of the cam comes under the bowl of the lever $D^2$, the fashioning apparatus, by its own weight, drops into the working position.

The mechanism for giving two traversing motions to the thread-carriers for one rotation of the cam-shaft X is shown particularly at Figs. 6, $6^*$, and $6^{**}$. Mounted loosely on this shaft is a miter-wheel, E', the boss of which carries a collar, $e'$, which is notched to receive the tooth $e^2$ of a projection from the sliding clutch $e^3$, connected to the shaft X by a feather. This clutch is provided with a groove, into which takes the forked arm $E^2$ for actuating it. This forked arm is loosely mounted upon the shogging-shaft $J^2$, between fixed collars $E^7$ $E^7$, which impart to it the requisite lateral shifting motion. A lug, $e^4$, projecting from this forked lever, interlocks with the teeth of the miter-wheel E' when the sliding clutch is disengaged, as shown at Fig. $6^*$, and thus retains the miter-wheel E' in position for the clutch to re-engage therewith. In order to prevent this miter-wheel from moving endwise when its shaft X is shogged or when the sliding clutch is thrown out of action, and thereby disengaging itself from the miter-wheel $E^3$, which it is intended to drive, a finger, $e^5$, projecting from the framing enters a groove, $e^6$, on the boss of the miter-wheel E on the inner side, and thus retains it in gear with the miter-wheel $E^3$. The tooth $e^2$ of the sliding clutch $e^3$ enters a notch in the collar $e'$ of the miter-wheel E', and serves to interlock therewith. When the clutch is shifted by the forked arm $E^2$, in the manner hereinafter explained, the tooth $e^2$ will be advanced clear of the notched collar, as shown at Fig. $6^*$, and the driving-connection with the cam-shaft X will be broken, leaving the shaft X free to rotate and move endwise, as hereinafter described, without affecting the miter-wheel E'. The miter-wheel $E^3$ is keyed to a transverse shaft, $E^4$, which has its bearing on the framing of the machine and carries at its rear end a cam, $E^5$. (Shown detached at Fig. $6^a$.) This cam acts alternately on the bowls $e^*$ $e^*$, mounted on studs carried by a sliding bar, $E^6$, which is connected by a link, $E^7$, to a vertical oscillating arm, $E^8$, having its fulcrum at the base of the machine. The upper end of this arm is connected by a link-rod, $E^9$, to the ordinary slur-box, from which the sliding motions of the thread-carrier rods $E^*$ $E^*$ are obtained. As the cam-shaft is rotated, its motion will be transmitted through the miter-wheel to the cam $E^5$, which, for every rotation, will impart two vibrations to the oscillating arm $E^8$, and by reason of the connection of this arm with the slur-box, two traverse motions will be given to the slur-box, and, consequently, two lays of threads will be delivered to the needles for every rotation of the cam-shaft.

The tappet-chain $G^*$ (see Figs. 2 and $2^a$) is employed, as usual, to initiate the movements by which the shogging shaft $J^2$ is operated and through it the cam-shaft is shogged. This chain $G^*$ is carried on chain-wheels, one at the front and one at the back of the machine. The front chain-wheel, G, is mounted on a pendent arm, $G^{**}$, mounted loosely on the shaft $A^7$.

This pendent arm is furnished at its lower end with a bowl bearing against a cam, K, on the cam-shaft. The back chain-wheel is carried on the upper end of a rock-lever pivoted on a bracket from the framing of the machine. The lower end of this lever is drawn toward the frame by a coiled spring, thus keeping the chain taut and holding the bowl of the pendent arm $G^{**}$ against the cam K.

Pivoted at the lower end of the pendent arm $G^{**}$ is a bell-crank lever, $g$, the upper arm of which carries a stud, $g^*$, in front of the chain $G^*$. A coiled spring connecting the pendent arm $G^{**}$ with the lower limb of the bell-crank lever, causes the stud $g^*$ to bear upon the chain. At the same time the lower arm of the bell-crank lever is held clear of the stud $g'$, carried by the arm G' keyed on the shogging-shaft $J^2$. At the same time the lower arm of the bell-crank lever is thus retained in such a position that during the oscillations of the pendent arm it passes over the stud $g'$ without touching it. The front chain-wheel, G, is furnished with ratchet-teeth, $g^2$, into which takes a pawl, $g^3$, pivoted on a portion of the framing, and also a retaining-pawl, $g^4$, carried by the swinging arm G. As, therefore, the swinging arm G falls toward the cam-shaft the pawl $g^3$ will give a step-by-step rotary motion to the chain-wheel G, and a progressive motion to the tappet-chain G*. This progressive motion serves to bring up an inclined tappet and force it between the chain and the stud $g^*$ of the upper arm of the bell-crank lever, depressing the lower-arm into a position that, when the swinging arm G** is thrust forward by the cam K, the bell-crank lever will strike the stud $g'$, carried by the arm G', and thereby rock the shogging-shaft $J^2$, so as to place the bowl of the arm $J^3$ keyed to the shaft (see also Figs. 7 and 8) into the proper position for being acted upon, or for itself acting on the shogging-cam J J'. The arm $J^3$ is provided with a coiled spring, by which it is constantly drawn toward the cam-shaft X. The cut of the cam K, as modified to suit the altered timing of the machine, and accord with the action of the double inclines of the shogging-cams J J', now to be described, is shown at Fig. 14.

The shogging-cam is formed of two concentric parts, J and J', which face each other, but are of different diameters, and each carries at its edges two inclines for acting upon the bowl of the arm $J^3$ of the shogging-shaft $J^2$. The first incline on the part J, by acting upon the bowl of the arm $J^3$, will shift the shogging-shaft laterally to the left, thereby disconnecting the clutch $e^3$ from the miter-wheel E', and stopping the further action of this gear, and hence that of the slur-box and thread-carriers. At the same time this shogging motion of the shaft $J^2$ will shift the racking mechanism of the fashioning-slides into action, and move the supporting-arm I$^4$ (see Fig. 5) into position to receive the lever I$^2$ of the snapping mechanism, as usual, the action of that mechanism not being required during fashioning. The action of the shogging-shaft upon the fashioning apparatus may be clearly traced in Figs. 2$^b$ and 2$^d$. Thus, supposing the shogging-shaft to have brought the cams X' under the levers $d^5$, the levers will be lifted, and the pawls $d^6$ $d^3$, acting on the traversing screws of the slide $d'$, will move the latter inward, and with them the fashioning-point bars D D*. The ordinary fashioning or supplemental single-acting cams which regulate the to-and-fro motion of the needles, and those which regulate the rising and falling of the fashioning-points, now acting in conjunction with this rocking in of the slides $d'$, will effect the removal and replacement of the selvage-loops in the well-known manner.

The cam-shaft X is fitted with a friction-clip, $'x$, (shown at Fig. 6**) and it consists of a split flanged collar lined with leather, situate near one of the bearings of the cam-shaft X, and it is caused to grip the shaft by an adjusting-screw, $x^*$. A finger, $x'$, projecting from the bearing holds the clip by its flange $x^2$ from moving endwise, but allows of it rotating freely. The friction-clip $x$ insures that the shogging-shaft $J^2$ shall move endwise before a like movement of the cam-shaft X, when the first incline of the shogging-cam J J' acts on the bowl of the arm $J^3$. This endwise movement of the shogging-shaft $J^2$ brings one or the other of the adjustable collars $j$ $j$, secured to that shaft, up to a bearing carried by the framing, and its endwise motion is thus limited. After the first incline of the part J of the shogging-cam J J' has acted upon the shogging-shaft $J^2$, as above described, the second incline of the part J of the shogging-cam as it comes round will now shog the cam-shaft in the reverse direction, and bring the fashioning-cams into action, the cam-shaft X sliding freely through the clutch $e^3$ and the miter-wheel E'. The cam K will hold the bowl of the lever $J^3$ opposite the part J of the shogging-cam until the two inclines of the shogging-cam have passed. The cam K will then present a smaller radius to the bowl of the pendent or swinging arm G**, and allow the arm and bell-crank lever $g$ which it carries to move toward the cam-shaft, followed by the arm G', and thus rocking the shaft $J^2$ until the arm is arrested by a standard carried by the frame. (See Fig. 2$^c$.) The bowl carried by the arm $J^3$, (keyed on the shaft $J^2$,) will also fall toward the cam-shaft, and at the proper time will be acted upon in like manner by the two inclines of the other part, J', of the shogging-cam, and move back, first, the shogging-shaft $J^2$, and then the cam-shaft, whereby the knitting-cams will be again brought into action, and the miter-wheels will be caused to transmit motion to the thread-carriers.

We have now explained the nature of the changes introduced into the machine to produce the result above mentioned, and we have given detached views of the several cams which we employ to double the productive capacity of the machine. In order, however, to make the movements of the knitting-instruments more clear, we have added a series of diagrams, by reference to which the various operations of the knitting-instruments may be clearly traced.

Figs. 15 to 21, inclusive, are diagrams illustrating the various motions of the knitting-instruments, the parts being drawn on an enlarged scale. Fig. 15 indicates the position of the parts during the indenting of the thread; Fig. 16, the position of the parts when dividing. Fig. 17 illustrates the pressing operation; Fig. 18, the knocking over of the formed loop, showing the sinkers in their back position; Fig. 19, the forward position of the needles, the work being brought under the nibs of the dividing-sinkers to prevent it rising with the rise of the needles; Fig. 20, the needles rising through the "dividing" sinkers, bringing the selvage-needle to the proper side of the tread for insuring the formation of a perfect selvage, the sinkers remaining in their back position; Fig. 21, the needles raised to the position to receive the thread. On examining the diagrams those familiar with the old machine as formerly constructed will observe at Figs. 20 and 21 two new positions of the knitting instruments—i. e., of the needles and sinkers at the time just prior to and during the traverse of the thread-carriers. To make this more clear we have illustrated, on a still more enlarged scale at Fig. 20ª, the position of the parts at Fig. 20, the same being represented in front elevation, in side elevation, and in plan view. We have also shown, in like manner and on a like scale at Fig. 21ª, the position of the parts represented at Fig. 21.

It has been stated with reference to diagram, Fig. 1, that the needles are advanced nearer than heretofore to the plane of motion of the thread-carriers preparatory to the traverse of the thread-carriers. In Fig. 20ª the position which the thread takes with respect to the selvage-needle, preparatory to the laying of the thread in front of the needles, will be more clearly shown, as its vertical as well as its horizontal inclination has been given. At this time the jack-sinkers are out of action and the thread takes the direction of a line drawn straight from the back of the needles to the thread-carrier. There is no need, therefore, for the jack-sinker to hold the thread in position for the rising needle to clear it, and hence the saving of one movement of the sinkers.

At Fig. 21ª it will be seen that the thread-carrier can start to lay its thread around the selvage-needle without waiting for the beard of the needle to rise above the nibs of the dividing-sinkers. Thus a further economy of time is effected, the jack-sinkers offering no impediment to the laying of the thread so soon as the head of the needle emerges from between the dividing-sinkers.

We will now show what saving of time is effected by our invention and how that time is utilized to double the productive power of the Cotton knitting-machine. A comparison of certain of the old cams with the new will serve to clear up these points. Fig. 22 shows the cut of cams used in the ordinary Cotton machine for operating the needle-bar for "pressing" and "knocking over" the work; and Fig. 22ª shows the cams which we employ for the same operations. In each case a circle drawn on the cams is divided up equally into twenty parts, such number of parts corresponding to one rotation of the cams. In these figures A⁴ is the knocking-over cam and A⁵ the presser-cam.

It will be seen from the following table what are the proportional times required for the successive operations under the old and new systems:

|  | Old cam. | New cam. | Gain effected. |
|---|---|---|---|
| Time allowed from commencement of traverse of the thread-layers to the completion of the advance of the jack-sinkers.... | 9.0 | 5.8 | 3.2 |
| From this advance to the pressing-point | 4.0 | 1.9 | 2.1 |
| From pressing-point to the back and lowest position of needles, (i. e., knocking over point,).... | 2.0 | 1.3 | 0.7 |
| Horizontal advance of needles... | 1.5 | 0.7 | 0.8 |
| Rise of needles to starting of thread-carriers | 3.5 | 0.3 | 3.2 |
| Totals | 20.0 | 10.0 | 10.0 |

These totals show that the gains in time from the lowest position of the needles to the position when the next course commences, obtained by adding together the two last items in the gains-effected column, equals 4.0. Gain of time due to the alteration or bringing closer together the presser and knocking-over motions equals 2.8. Gain due to alteration of gear for thread-layer motion equals 3.2, making a total gain of 10.0, or half the time of the old cam motions, thereby leaving the second half of the rotation of the cam-shaft to repeat the knitting action.

The same illustration is shown with reference to the catch-bar cams which operate the jack and dividing sinkers at Figs. 23 and 23ª.

|  | Old cam. | New cam. | Gain effected. |
|---|---|---|---|
| Time allowed from commencement of traverse of the thread-layers to the completion of the advance of the jack-sinkers when these cams are inactive... | 9.0 | 5.8 | 3.2 |
| From this advance to dividing-point | 1.1 | 0.9 | 0.2 |
| From dividing-point to pressing-point | 2.9 | 1.0 | 1.9 |
| From pressing-point to back position of sinkers | 2.0 | 1.3 | 0.7 |
| From the backward position of sinkers to the second forward position of sinkers* | 1.8 | nil. | 1.8 |
| From advance to recession of sinkers* | 2.2 | nil. | 2.2 |
| Inactive position of cam, being the time allowed to the starting of the thread-carriers | 1.0 | 1.0 | nil. |
| Totals | 20.0 | 10.0 | 10.0 |

Thus by the omission of the two motions marked * and the substitution of others less complicated to perform the same operations, we make a gain of 4.0, the gain in the other motions being 6.0, making a total gain of 10.0, as in the preceding illustration.

What we claim is—

1. The combination, with the traversing thread-carrier, of the vertically-moving needle-bar carrying the needles, and mechanism, substantially as described, by which the needle-bar is given a lateral movement toward the thread-carrier before its upward movement, so that upon its upward movement the selvage-needle will rise upon the proper side of the thread to form the selvage-loops without the assistance of the sinkers, substantially as described.

2. The combination, with the presser-bar and the jack and dividing sinkers, the latter being arranged, as described, so that their nibs project beyond the edge of the bar when in their inactive position, or at the time the needles rise, of the vertically-moving needle-bar carrying the needles, and mechanism, substantially as described, by which the needle-bar is given a lateral movement toward the presser-bar before its upward movement, so that upon its upward movement the needles will pass between the nibs of the sinkers, substantially as described.

3. The combination, with the presser-bar and the jack and dividing sinkers, the latter being arranged, as described, so that their nibs project beyond the edge of the bar when in their inactive position, or at the time the needles rise, of the vertically-moving needle-bar carrying the needles, and mechanism, substantially as described, by which the needle-bar is given a lateral movement toward the presser-bar before its upward movement, so that upon its upward movement the needles will pass between the nibs of the sinkers, and a further lateral movement toward the presser-bar upon its downward movement, so as to close the beards of the needles, substantially as described.

4. The combination, with the presser-bar, the jack and dividing sinkers, the latter being arranged, as described, so that their nibs project beyond the edge of the bar when in their inactive position, or at the time the needles rise, and the knock-over bits, of the vertically-moving needle-bar carrying the needles, and mechanism, substantially as described, by which the needle-bar is given a lateral movement toward the presser-bar before its upward movement, so that upon its upward movement the needles will pass between the nibs of the sinkers, and a further lateral movement toward the presser-bar upon its downward movement, so as to close the beards of the needles, and then a lateral movement away from the presser-bar to carry the needles between the knock-over bits, substantially as described.

5. The combination, with the presser-bar and the jack and dividing sinkers, the latter being arranged, as described, so that their nibs project beyond the edge of the bar when in their inactive position, or at the time the needles rise, and mechanism, substantially as described, for giving the sinkers but one forward and back movement to each traverse of the thread-carrier, of the vertically-moving needle-bar carrying the needles, and mechanism, substantially as described, by which the needle-bar is given a lateral movement toward the presser-bar before its upward movement, so that upon its upward movement the needles will pass between the nibs of the sinkers, substantially as described.

6. The combination, with the traversing thread-carrier $e$, the cam $E^5$, and connections between the thread-carrier and the cam, for operating the same, the jack and dividing sinkers $c\ c^*$, and the jacks $e'$ and catch-bar H, and mechanism, substantially as described, for operating the jacks and catch-bar by which sinkers are caused to have but one forward and one backward movement to each traverse of the thread-carrier, of the vertically-moving needle-bar A, carrying bearded needles, and the duplex-action cams $A^4\ A^5$, and connections, substantially as described, between the needle-bar and cams, whereby the needle-bar is given a lateral movement toward the thread-carrier before its upward movement, so that upon its upward movement the selvage-needles will rise upon the proper side of the thread to form the selvage-loops without the assistance of the sinkers, substantially as described.

7. The combination, with the traversing thread-carrier $e$, the cam $E^5$, shaft $E^4$, gear $E^3$, and connections between the thread-carrier and the cam, for operating the same, the jack and dividing sinkers $c\ c^*$, and the jacks $e'$ and catch-bar H, and mechanism, substantially as described, for operating the jacks and catch-bar by which the sinkers are caused to have but one forward and one backward movement to each traverse of the thread-carrier, of the vertically-moving needle-bar A, carrying bearded needles, the duplex-action cams $A^4\ A^5$, and connections, substantially as described, between the needle-bar and cams, whereby the needle-bar is given a lateral movement toward the thread-carrier before its upward movement, so that upon its upward movement the selvage-needles will rise upon the proper side of the thread to form the selvage-loops without the assistance of the sinkers, and the miter-wheel E', shogging-cams J J', arm $J^3$, shogging-shaft $J^2$, and connections between the shogging-shaft and the gear E', substantially as described, whereby the traversing movement of the thread-carrier $e$ may be stopped during the fashioning operation, substantially as described.

SAMUEL LOWE.
JOHN WILLIAM LAMB.

Witnesses:
 H. K. WHITE,
 G. H. G. MATHIESON,
  *Both of 66 Chancery Lane, London.*